2,951,879
Patented Sept. 6, 1960

2,951,879

CYCLOHEXADIENES AND PROCESS FOR PREPARING SAME

William R. Edwards, Baytown, and Harold W. Earhart, Houston, Tex., assignors, by mesne assignments, to Esso Research and Engineering Company, Elizabeth, N.J., a corporation of Delaware No Drawing. Filed Sept. 27, 1957, Ser. No. 686,558

5 Claims. (Cl. 260—666)

This invention relates to a novel class of substituted cyclohexadienes and to a method preparing the same. More particularly, this invention relates to hepta substituted cyclohexadienes and to the method by which they are prepared.

In accordance with the present invention, a compound selected from the class consisting of 1-methylene-2,3,4,4,5,6-hexamethyl cyclohexadiene and 1-ethylidene-2,3,4,4,5,6-hexaethyl cyclohexadiene is prepared by alkylating benzene or a methyl or ethyl substituted benzene with the corresponding methyl or ethyl halide (depending on the cyclohexadiene to be prepared) in the presence of a Friedel-Crafts catalyst under Friedel-Crafts alkylation conditions, and recovering the desired cyclohexadiene from the resultant reaction product. As indicated, when an ethyl substituted cyclohexadiene is to be prepared, the starting materials are benzene, an ethyl substituted benzene, or a mixture thereof, and ethyl chloride. When the methyl substituted cyclohexadiene is to be prepared, the starting materials are benzene, methyl substituted benzenes, or mixtures thereof, and methyl chloride. Among the methyl substituted benzenes that may be used with satisfactory results are toluene; xylenes such as ortho-, meta-, or paraxylene; the isomeric trimethyl benzenes; the isomeric tetramethyl benzenes; pentamethyl benzene; hexamethyl benzene; etc. and mixtures thereof. Similarly, ethyl benzenes, diethyl benzenes, triethyl benzenes, tetraethyl benzenes, pentaethyl benzene, hexaethyl benzene and suitable mixtures thereof may be employed.

In general, it is preferable to employ the more highly substituted methyl or ethyl benzenes. Thus, preferred starting materials for the present invention are benzenoid compounds containing at least three substituent methyl or ethyl groups.

Friedel-Crafts catalysts that may be employed for the alkylation reaction for the preparation of the cyclohexadiene in good yield include Friedel-Crafts catalysts such as anhydrous aluminum halides (e.g., aluminum chloride, aluminum bromide), hydrofluoric acid, mixtures of hydrofluoric acid with boron trifluoride, etc. A preferred Friedel-Crafts catalyst is anhydrous aluminum chloride.

The cyclohexadienes of the present invention complex with the Friedel-Crafts catalyst in the alkylation product in the form of a complex which is very slightly soluble in the hydrocarbon components of the charge mixture. The complex is contained in the higher density liquid complex phase resulting from the alkylation reaction. The cyclohexadienes may be conveniently recovered by separating the complex phase from the lower density liquid phase at the end of the reaction, treating the complex phase with water at a temperature of less than about 50° F., separating an oil phase from the hydrolysis product, and recovering the cyclohexadiene from the resultant oil phase by any suitable method such as fractional crystallization.

The benzenoid starting material is reacted with the alkyl halide (e.g., alkyl chloride or bromide) in the presence of a Friedel-Crafts catalyst under alkylation conditions in order to form the cyclohexadiene product of the present invention. The alkylation conditions to be employed will be dependent, in large measure, on the particular Friedel-Crafts catalyst involved. For example, with aluminum chloride such conditions include a temperature within the range of about 50° to 300° F., a pressure within the range of about 0 to 50 p.s.i.g., and a reaction time within the range of about 10 to 0.1 hour. The reaction should be conducted under Friedel-Crafts alkylation conditions (e.g., under essentially anhydrous conditions in an inert atmosphere). In particular, oxygen should be excluded from the reaction zone. The yield of the cyclohexadiene of the present invention is maximized when a temperature not exceeding about 200° F. is employed and, more preferably, a temperature within the range of about 175° to 200° F. at atmospheric pressure is employed.

Although the amount of Friedel-Crafts catalyst to be employed may be varied within wide limits, it is generally preferable to utilize from about 0.1 to 1.0 mol of aluminum chloride per mol of benzenoid starting material. For a maximum yield of the cyclohexadiene, it is preferable to employ about 1 mol of catalyst per mol of benzenoid starting material.

The amount of alkyl chloride to be employed will be dependent, in part, upon the degree of substitution of the benzenoid starting material. Thus, when the starting material is benzene, at least about 4 mols of alkyl chloride per mol of benzene should be employed. In this situation, it is desirable to employ about 7 mols of alkyl chloride per mol of benzene in order to maximize the yield of cyclohexadiene. With substituted benzenoid compounds, the amount of alkyl chloride to be employed may be reduced by an amount corresponding to the degree of substitution of the benzenoid starting material. For example, the yield of the methyl substituted cyclohexadiene may be maximized when employing about 4 mols of methyl chloride per mol of pseudocumene in a situation where pseudocumene is the starting material.

The cyclohexadienes of the present invention may be utilized for a variety of purposes. Thus, for example, they may be utilized for indicators for the detection of trace amounts of oxygen in oxygen-lean atmospheres, as intermediates in the manufacture of chemical reagents such as oxidation inhibitors, etc.

The invention will be further illustrated by the following specific examples which are given by way of illustration and not as limitations on the scope of this invention.

*Example 1*

Prepare a mixture of equimolar amounts of aluminum chloride and durene in a reactor blanketed with nitrogen. Heat the mixture to a temperature of about 200° F. with agitation under essentially anhydrous conditions and then bubble methyl chloride through the resultant complex at said temperature until methyl chloride consumption ceases. Cool the reaction mixture to room temperature and allow the oil phase to separate from the complex phase. Separate the complex phase from the oil phase and hydrolyze the complex phase by adding thereto about 10 parts of ice water per part of complex phase at room temperature. A water insoluble hydrolysis product is formed. Recover the water insoluble product by extraction with ligroin and treat the same with concentrated hydrochloric acid to extract acid soluble compounds. After removal of insoluble impurities, neutralize the hydrochloric acid solution to precipitate an oil phase from the acid solution. The product is 1-methylene-2,3,4,4,5,6-hexamethyl cyclohexadiene, having the following formula:

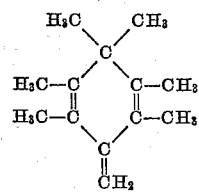

The compound melts at 115°–116° F. It is easily soluble in concentrated hydrochloric acid and precipitates on dilution with water. It has a mass of 176. The infrared spectrum shows an absence of hydroxyl bands, a $(CH_3)_2C$ grouping and two bands consistent with the methylene group. The infrared analysis further shows that the compound is non-aromatic. The high resolution nuclear magnetic resonance spectroscopic spectrum shows three bands, one of unit area 2 corresponding to methylene, a next band of unit area 12 corresponding to C=C—C—H, and a final band of unit area 6 characteristic of aliphatic C—H. The ultraviolet spectrum of the cyclohexadiene has a maximum at 257 m$\mu$ (E 22,000).

The compound is clear and colorless but, on exposure to oxygen, rapidly discolors to form an orange colored oxidation product. Even in the presence of trace amounts of oxygen, discoloration occurs. Thus, when the cyclohexadiene is placed in a closed container and about 0.01 mol percent of oxygen is added, the color of the cyclohexadiene is changed to a yellow which readily deepens into orange as the oxygen content is increased.

It is to be observed that on hydrolysis of the complex with methanol the product that is formed is hexamethyl benzene.

*Example II*

Repeat Example I, but in this instance employ a mixture of tetraethyl benzenes as the benzenoid starting material and ethyl chloride as the alkyl chloride reactant. The product in this instance is 1-ethylidene-2,3,4,4,5,6-hexaethyl cyclohexadiene.

What is claimed is:
1. 1-methylene-2,3,4,4,5,6,-hexamethyl cyclohexadiene.
2. A method for preparing 1-methylene-2,3,4,4,5,6-hexamethyl cyclohexadiene which comprises alkylating a tetramethyl substituted benzene with methyl chloride in the presence of about 0.1 to 1 mol of aluminum chloride per mol of benzenoid compound under alkylation conditions including a temperature within the range of about 50° to 300° F., a pressure of about 0 to 50 p.s.i.g. and a reaction time within the range of about 10 to 0.1 hour to form a hydrocarbon insoluble reaction product, recovering said insoluble reaction product, hydrolyzing said insoluble reaction product at a temperature of less than about 50° F. and recovering said cyclohexadiene compound from said hydrolysis product.
3. A method as in claim 2 wherein about 1 mol of aluminum chloride per mol of benzenoid feed stock is employed and wherein the alkylation reaction is conducted at a temperature within the range of about 175° to 200° F.
4. A method for preparing 1-ethylidene-2,3,4,4,5,6-hexaethyl cyclohexadiene which comprises alkylating a tetraethyl substituted benzene with ethyl chloride in the presence of about 0.1 to 1 mol of aluminum chloride per mol of benzenoid compound under alkylation conditions including a temperature within the range of about 50° to 300° F., a pressure of about 0 to 50 p.s.i.g. and a reaction time within the range of about 10 to 0.1 hour to form a hydrocarbon insoluble reaction product, recovering said insoluble reaction product, hydrolyzing said insoluble reaction product at a temperature of less than about 50° F. and recovering said cyclohexadiene compound from said hydrolysis product.
5. A method as in claim 4 wherein about 1 mol of aluminum chloride per mol of benzenoid feed stock is employed and wherein the alkylation reaction is conducted at a temperature within the range of about 175° to 200° F.

References Cited in the file of this patent

UNITED STATES PATENTS 2,211,704   Robinson _____ Aug. 13, 1940

OTHER REFERENCES

Gustavson: Journal of the Chemical Society, vol. 84 (1903), Abstracts, pp. 470–471 relied on.

Auwers et al.: Annalen der Chemie, vol. 425 (1921), pp. 217–280 (pp. 222 and 223 only relied on).

Egloff: Physical Constants of Hydrocarbons, vol. II, ACS Monograph Series #78 (1940), Reinhold Publishing Corp., New York, pp. 432–437 only relied on.